United States Patent [19]
Hayashi et al.

[11] Patent Number: 5,353,595
[45] Date of Patent: Oct. 11, 1994

[54] NONSTEP HYDROSTATIC TRANSMISSION

[75] Inventors: Tsutomo Hayashi; Mitsuru Saito; Yoshihiro Nakajima, all of Tokyo, Japan

[73] Assignee: Honda Giken Kogyo Kabushiki Kaisha, Tokyo, Japan

[21] Appl. No.: 79,122

[22] Filed: Jun. 17, 1993

[30] Foreign Application Priority Data

Jun. 17, 1992 [JP] Japan ................... 4-158214

[51] Int. Cl.⁵ ............................. F16D 39/00
[52] U.S. Cl. ........................ 60/489; 60/488; 60/494
[58] Field of Search ............... 60/464, 468, 488, 489, 60/494

[56] References Cited

U.S. PATENT DOCUMENTS 4,860,540  8/1989  Hayashi et al. ............... 60/487
5,054,289  10/1991  Nagatomo .................... 60/468

FOREIGN PATENT DOCUMENTS 0273631  7/1988  European Pat. Off. .
0297928  1/1989  European Pat. Off. .
2-113168  4/1990  Japan .
3-163253  7/1991  Japan .
4-203554  7/1992  Japan .
4203553  11/1992  Japan .
2224336  5/1990  United Kingdom .

Primary Examiner—Edward K. Look
Assistant Examiner—F. Daniel Lopez

[57] ABSTRACT

A clutch valve is constituted with a valve cylinder fitted in and fixed to the center of a cylinder block in a manner to form with the cylinder a third ring-shaped oil passage and a second ring-shaped oil passage to communicate with a first ring-shaped oil passage and a valve body slidably fitted in the valve cylinder in a switchable manner to communicate between the third and second ring-shaped oil passages and/or shut them off from each other.

5 Claims, 11 Drawing Sheets

NONSTEP HYDROSTATIC TRANSMISSION

BACKGROUND OF THE INVENTION

The field of the present invention is nonstep hydrostatic transmissions.

Various nonstep transmissions have been disclosed. Reference is made to Japanese Patent Application Laid-Open No. 3-163253, Japanese Patent Application Laid-Open No. 2-113168 and Japanese Patent Application Laid-Open No. 4-203554, the disclosures of which are incorporated herein by reference.

A nonstep transmission according to Japanese Patent Application Laid-Open No. 3-163253 has a plurality of clutch valves radially arranged in a cylinder block in a manner to allow them to reciprocate in the radial direction of the cylinder block in engagement with a clutch control ring encircling the cylinder block. Such a transmission requires a large cylinder block with a large number of clutch valves. Inevitably such devices are heavy and require excessive manufacturing steps.

A nonstep transmission according to Japanese Patent Application Laid-Open No. 2-113168 has a clutch valve provided at the end of a shaft coaxially linked with a cylinder block. This arrangement requires an axially elongated transmission. Since the clutch valve is relatively wide with ring-shaped oil passages coaxially formed on its inner circumference and outer circumference, the flow resistance is large with a delay in response when the short-circuit flow of actuating oil is large in amount.

In Japanese Patent Application Laid-Open No. 4-203554, a nonstep transmission is disclosed which includes a pair of check valves compactly arranged inside a valve cylinder fitted in and fixed to the center of the cylinder block. This arrangement supplies actuating oil to ring-shaped oil passages coaxially formed on the inner circumference and outer circumference of the cylinder block. In the valve cylinder, a communicating hole is drilled in a position eccentric from the axes of the two check valves to communicate with oil supply passages formed on the two sides of the valve cylinder in the axial direction. Therefore, the thickness of the valve cylinder and its diameter become relatively large and the cylinder block is correspondingly large.

SUMMARY OF THE INVENTION

In view of the above, the present invention has its primary purpose to provide a nonstep hydrostatic transmission with a clutch valve arrangement to reduce cylinder block size, manufacturing complexity and operational response time.

In a first separate aspect of the present invention, a nonstep transmission is provided with a clutch valve which can be compactly arranged at the center of a cylinder block without requiring the cylinder to be enlarged. To this end, a clutch valve may be constituted with a valve cylinder fitted in and fixed to the center of a cylinder block with two ring-shaped oil passages formed therebetween. These passages may communicate with another ring-shaped oil passage. A valve body is slidably fitted into the valve cylinder in a switchable manner to selectively provide communication between the two ring-shaped oil passages. By this arrangement, it is possible to avoid the cylinder block becoming large and heavy. Since the valve cylinder may be made as a single piece requiring less processing steps and the valve cylinder made separately from the cylinder block, the clutch valve can be more easily processed and assembled. By making a distance between the first ring-shaped oil passage and the second ring-shaped oil passage and the clutch valve relatively short, it also becomes possible to ensure improved response.

In a second separate aspect of the present invention, the valve body of the clutch valve may be provided with two check valves to allow flow from each end of the valve cylinder to the two ring-shaped oil passages, respectively. A valve is fitted in and fixed to the center of the cylinder block with a two ring-shaped passages formed therebetween. Inside the valve cylinder, two check valves allow the supply of actuating oil from oil supply passages provided inside the cylinder block on either side of the valve cylinder to the two ring-shaped passages. A pair of communicating holes individually communicate with a side of the valve cylinder and with each other on the outer circumference of the cylinder block. Without requiring an eccentric communicating passage to be provided to the valve cylinder to communicate between the two oil supply passages, therefore, the cylinder block can be made compact in size.

BRIEF DESCRIPTION OF THE DRAWINGS

FIG. 1 is a cross-sectional plan view of a power unit for a four-wheel automobile.

FIG. 2 is a cross-sectional plan view of part of a nonstep transmission according to the present invention.

FIG. 3 is a plan view showing the remainder of the above nonstep transmission in cross section.

FIG. 4 is a cross-sectional view taken along a line 4—4 of FIG. 2.

FIG. 5 is a cross-sectional view taken along a line 5—5 of FIG. 2.

FIG. 6 is a cross-sectional view taken along a line 6—6 of FIG. 5.

FIG. 7 is a cross-sectional view showing a clutch valve in its clutch-off position.

FIG. 8 is a cross-sectional view showing the above clutch valve in its half-clutch position.

FIG. 9 is a cross-sectional view showing the above clutch valve in its clutch-on position.

FIG. 10 is a cross-sectional view taken along a line 10—10 of FIG. 1.

FIG. 11 is a cross-sectional view taken along a line 11—11 of FIG. 10.

Figure 1:
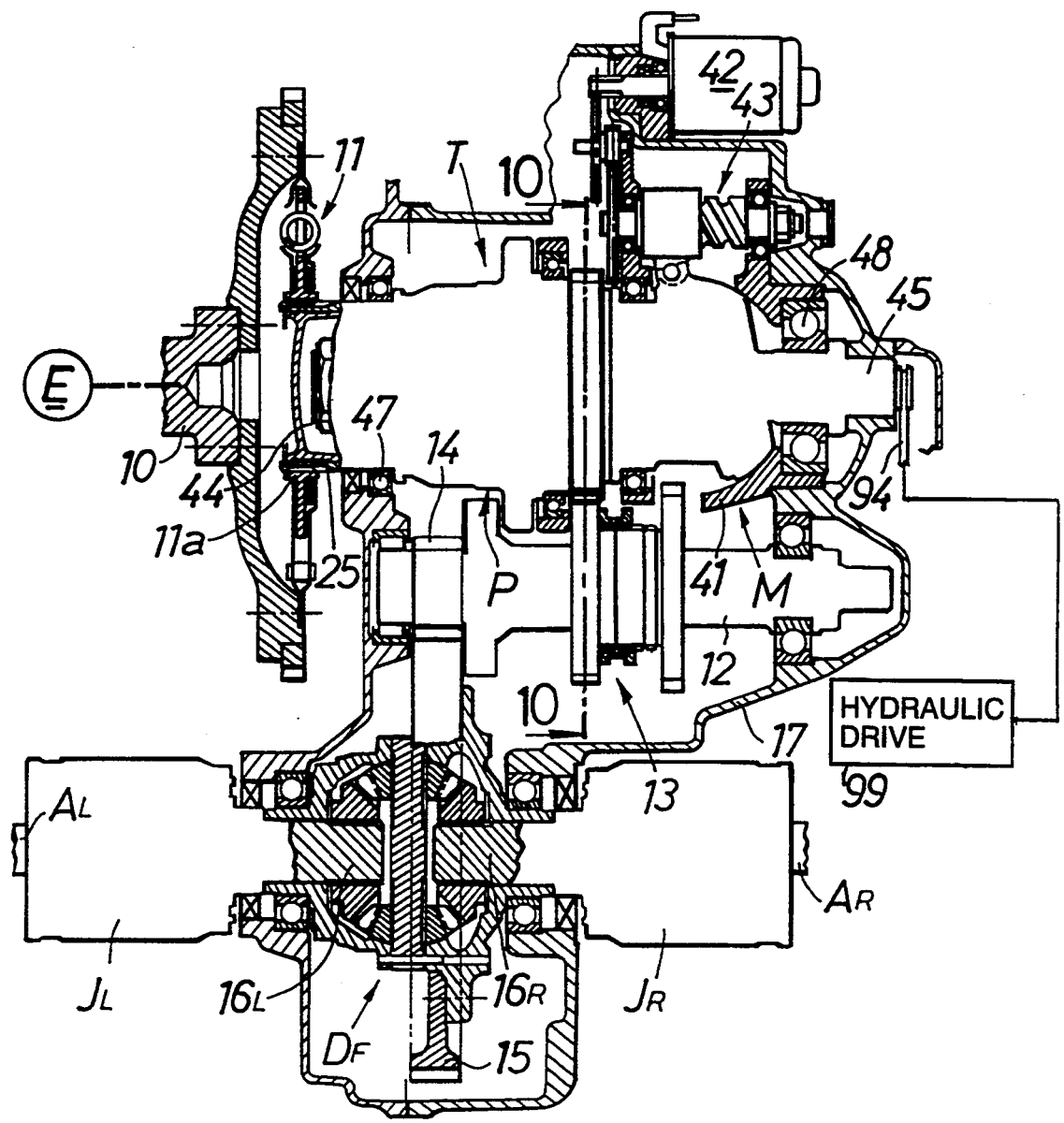
FIGS. 1 to 11 show a preferred embodiment of the present invention.

A nonstep transmission embodying the present invention for a four-wheel automobile will be described hereinafter with reference to the accompanying drawings.

The present device may be used with powered vehicles such as motorcycles and automobiles. Shown in FIG. 1, a power unit of a four-wheel front-engined, front-drive automobile has an engine E and a nonstep hydrostatic transmission T. The engine E has its shaft 10 coaxially linked with the nonstep transmission T through a starting clutch 11. An output from the nonstep hydrostatic transmission T is transmitted to an output shaft 12 parallel with the nonstep hydrostatic transmission T through a forward and backward drive change-over mechanism 13. The output shaft 12 has provided at its one end an output gear 14 engaged with a ring gear 15 of a differential device $D_F$. The differential device $D_F$ has its output shafts $16_R$ and $16_L$ linked with the axles $A_R$ and $A_L$ of right and left front wheels through uniform joints $J_R$ and $J_L$. With this structure, the driving force from the output shaft 12 is transmitted to the right and left front wheels as driving wheels through the differential device and the uniform joints $J_R$ and $J_L$. The nonstep hydrostatic transmission T, the output shaft 12 and the differential device $D_R$ are accommodated and supported in a common casing 17.

Figure 2:
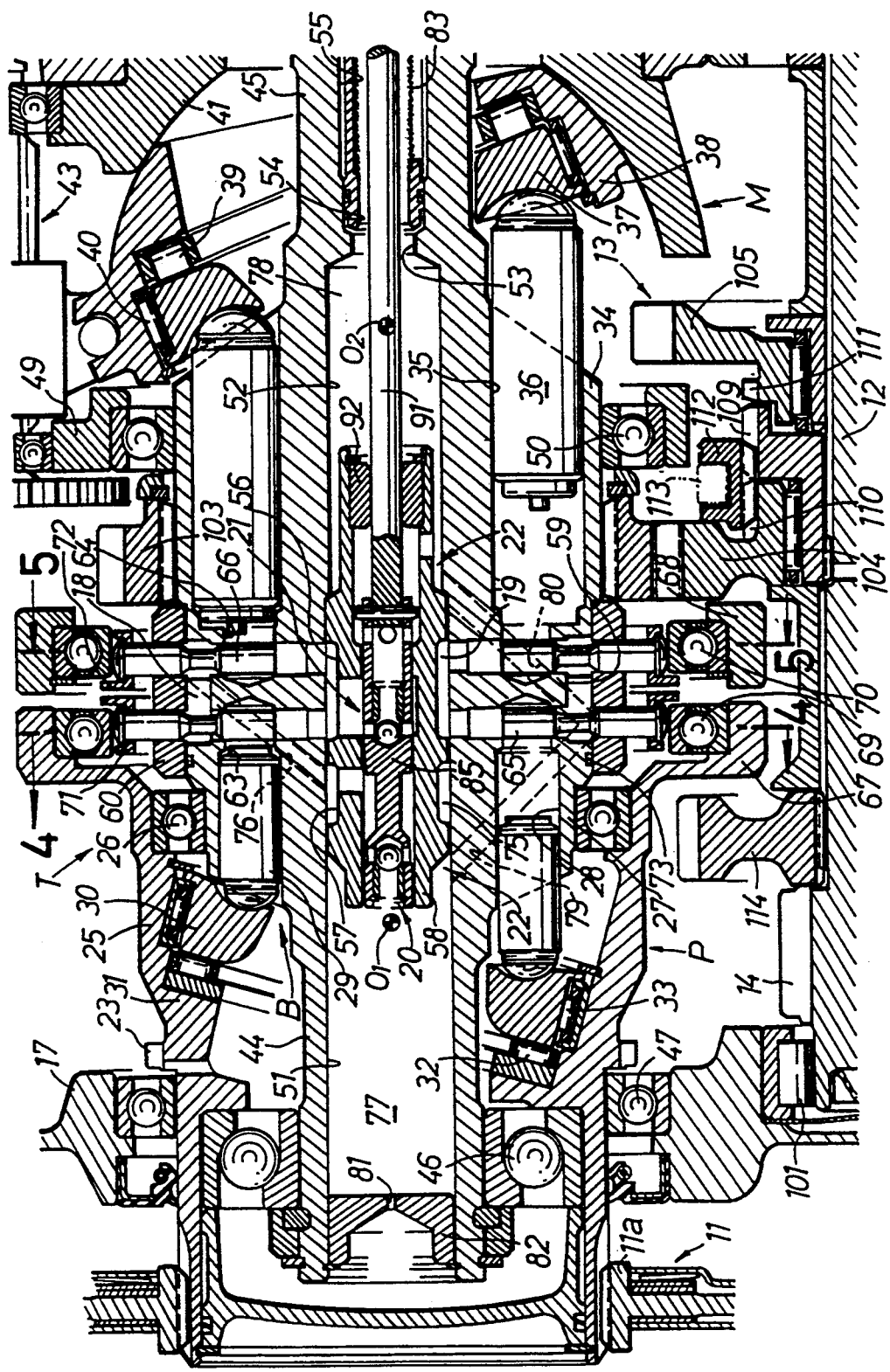
Figure 3:
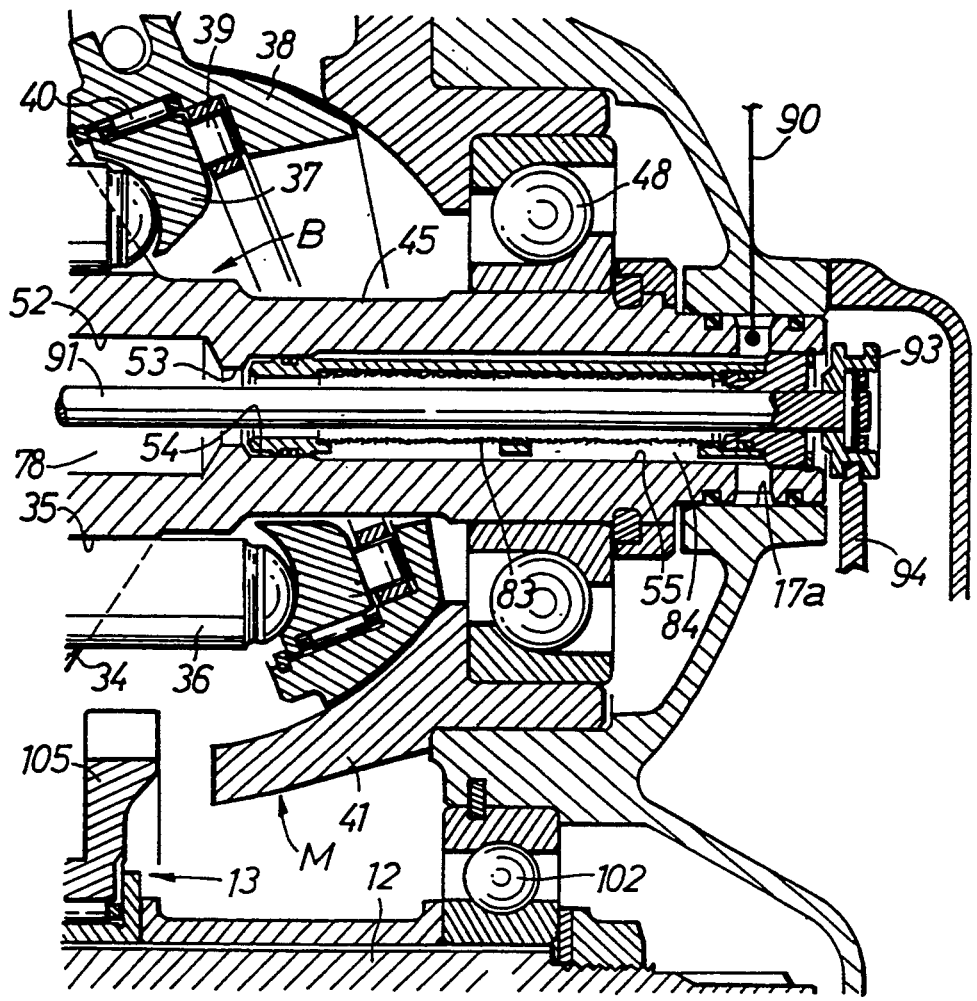

As shown in FIGS. 2 and 3, the nonstep hydrostatic transmission T comprises a constant-capacity swash plate hydraulic pump P and a variable-capacity swash plate hydraulic motor M combined together through a first ring-shaped oil passage 18 serving as a high-pressure passage under normal operational load and a low-pressure passage under reversed load and a second ring-shaped oil passage 19 serving as a low-pressure passage under normal operational load and a high-pressure passage under reversed load, in order to constitute a closed hydraulic circuit. To supply actuating oil, an oil supply pump (not shown) is connected to the first ring-shaped oil passage 18 through a first check valve 20 and to the second ring-shaped oil passage 19 through a second check valve 21. Between the first and second ring-shaped oil passages 18 and 19, there is provided a single clutch valve 22 which works in response to clutch operations by the driver. This clutch valve 22 is made switchable between a clutch-on position to shut off the two oil passage 18 and 19 from each other and a clutch-off position to communicate between the two oil passages 18 and 19 through a half-clutch position therebetween.

The swashplate hydraulic pump P is composed of an input cylinder shaft 25 having a gear to drive an oil pump not shown and spline-connected to an output element 11a of the starting clutch 11, a pump cylinder 27 supported to the inner circumferential wall of the input cylinder shaft 25 through a ball bearing 26 in a manner to allow its relative rotation, a plurality of pump plungers 29 slidably fitted into a large odd number of pump cylinder holes 28 provided in the pump cylinder 27 in a ring form encircling the rotational axis of the latter, a pump swashplate 30 having its front engaged with and abutting against the outer ends of the pump plungers 29 and a pump swashplate holder 31 to hold the pump swashplate 30 through a thrust bearing 32 and a radial bearing 33 in a position inclined with a certain degree from the axis of the pump cylinder 27 centering on a virtual trunnion line $O_1$ perpendicular to the axis of the pump cylinder 27. The pump swashplate holder 31 is formed integrally with the input cylinder shaft 25. When the input cylinder shaft 25 is rotated, the pump swashplate 30 reciprocates the pump plungers 29 and repeats their sucking and discharging processes.

The swashplate hydraulic motor M is composed of a motor cylinder 34 positioned coaxially with the pump cylinder on the right of FIG. 2, a plurality of motor plungers 36 slidably fitted into motor cylinder holes 35 provided to the motor cylinder 34 in a ring form encircling the rotational axis of the latter, a motor swashplate 37 having its front engaged with and abutting against the outer edges of the motor plungers 36, a motor swashplate holder 38 supporting the motor swashplate 37 through a thrust bearing 39 and a radial bearing 40 and a motor swashplate anchor 41 fixed to the casing 17 in a manner to support the back of the motor swashplate holder 38. The motor cylinder holes 35 are provided in the motor cylinder 34 in odd number equal to that of the pump cylinder holes 28 in the hydraulic pump P. The mutually facing surfaces of the motor swashplate holder 38 and the motor swashplate anchor 41 abutting against each other are formed in a spherical shape centering on the crossing of the axis of the motor cylinder 34 and a trunnion axis line $O_2$. Furthermore, the motor swashplate holder 38 is supporting to the motor swashplate anchor in a manner to allow its relative rotation around the trunnion axis line $O_2$. When the motor swashplate holder 38 is rotated around the trunnion axis line $O_2$ by a ball thread mechanism 43 linked to a pulse motor 42, the motor swash plate 37 is caused to operate between its upright position perpendicular to the axis of the motor cylinder 34 and its maximum inclined position inclined with a given degree, reciprocating the motor plungers 36 in correspondence to the rotation of the motor cylinder 34.

The pump cylinder 27 and the motor cylinder 34 are integrally formed together to constitute a cylinder block B which has provided integrally therewith coaxial shafts 44 and 45. In other words, the shaft 44 is projected integrally from the center of the pump cylinder 27 in the cylinder block B and the shaft 45 is projected coaxially with the shaft 44 and integrally from the center of the motor cylinder 34 in the cylinder block. Passing through the pump swashplate 30 and the pump swashplate holder 31, the shaft 44 is supported to the input cylinder shaft 25 through an angular contact ball bearing 46. Meanwhile, the input cylinder shaft 25 and the casing 17 have a ball bearing 47 interposed therebetween. The shaft 45 is extended in a manner to pass through the motor swashplate 37, the motor swashplate holder 38 and the motor swashplate anchor 41. There is interposed between the shaft 45 and the motor swashplate anchor 41 an angular contact ball bearing 48. The shaft 45 has its end passing through a through hole 17a provided to the casing 17. Between a support wall 49 integrally linked with the motor swash plate anchor 41 and the motor cylinder 34, there is interposed a ball bearing 50.

Figure 4:
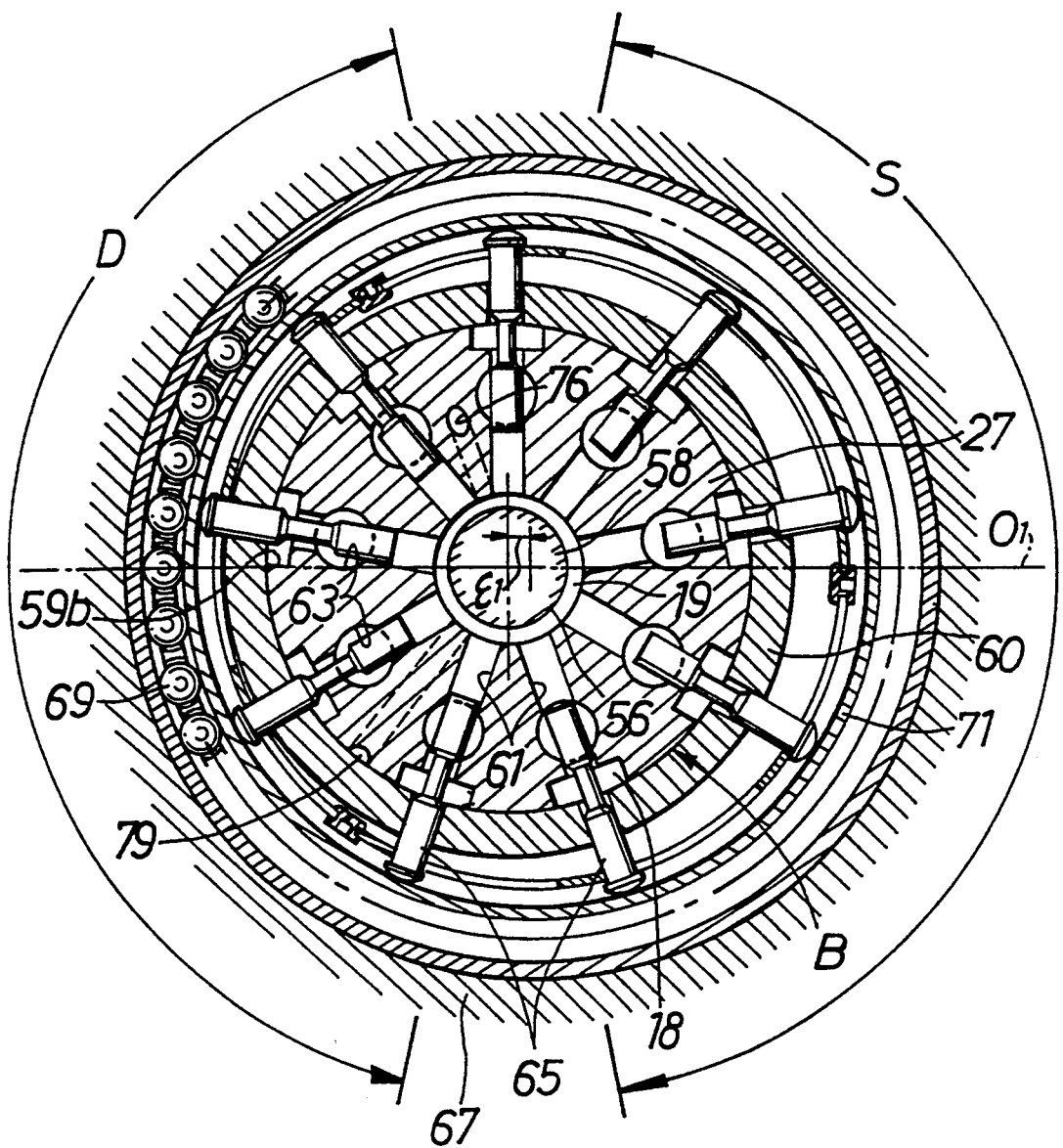
Figure 5:
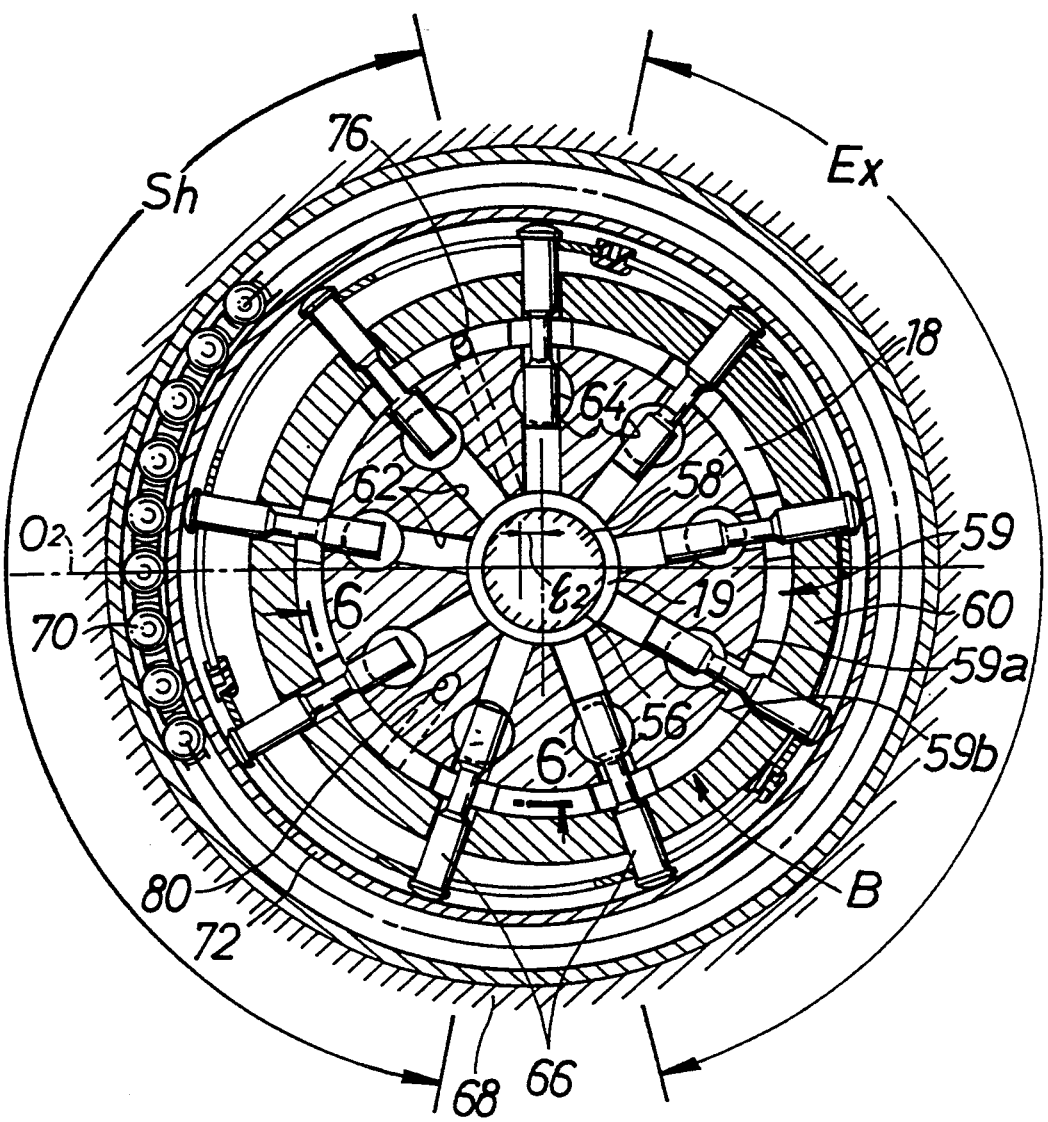

The center of the cylinder block B has provided coaxially thereto, in order from the side of the shaft 44 to the side of the shaft 45, a first center hole 51, a second center hole 52 smaller than the first center hole 51 in diameter, a third center hole 53 smaller than the second center hole 52 in diameter, a fourth center hole 54 larger than the third center hole 53 in diameter and a fifth center hole 55 larger than the fourth center hole 54 in diameter. As shown in FIGS. 4 and 5, the cylinder block B has provided the first ring-shaped oil passage 18 and the second ring-shaped oil passage 19 formed coaxial with the rotational axis of the cylinder block B between a group of the pump cylinder holes 28 of the pump cylinder 27 and a group of the motor cylinder holes 35 of the motor cylinder 34. The cylinder block B has pressed thereinto at its position closer to the second center hole 52 inside the first center hole 51 a valve cylinder 58 basically formed in a cylindrical shape with a first ring groove 56 and a second ring groove 57 provided on its outer circumference. The second ring-shaped oil passage 19 is formed by the inner surface of the first center hole 51 and the first ring groove 56. Between a group of the pump cylinder holes 28 and a group of the motor cylinder holes 35, the cylinder block B has provided on its outer circumference a third ring groove 59 and a ring body 60 inserted thereinto in a manner to cover the third ring groove 59. This ring body 60 is braze-welded to the cylinder block B. Thus, the first ring-shaped oil passage 18 is formed in a ring shape between the cylinder block B and the ring body 60.

Between a group of the pump cylinder holes 28 of the pump cylinder 27 and a group of the motor cylinder holes 35 of the motor cylinder 34, there are provided first and second valve holes 61 and 62 in number equal to that of the pump cylinder holes 28, in a manner to pass radially through a ring-shaped partitioning wall between the first ring-shaped oil passage 18 and the second ring-shaped oil passage 19 of the cylinder block B and the outer circumferential wall or the ring body 60. The first valve holes 61 are positioned on the side of a group of the pump cylinder holes 28 and the second valve holes 62 on the side of a group of the motor cylinder holes 35.

Figure 6:
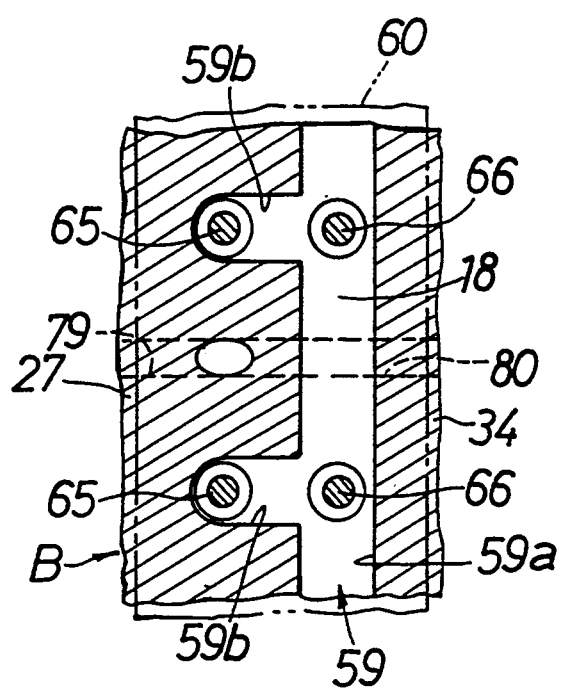

The third ring groove 59, as shown in FIG. 6, has a ring section 59a communicating commonly with the second valve holes 62 and a plurality of notched sections 59b communicating with the ring section 59a at their positions corresponding to the first valve holes 61. The cylinder block B has its outer circumference given a relatively greater surface facing to the ring body 60 to have a brazing filler welded between their two facing surfaces in a manner to make the ring body 60 securely and firmly fixed to the cylinder block B. Furthermore, the cylinder block B has provided on its outer circumference a groove 73 facing to the inner circumference of the ring body 60 to hold a brazing filler at the time of braze-welding.

The cylinder block B has drilled therein a plurality of pump ports 63 to communicate commonly with the pump cylinder holes 28 and the first valve holes 61 adjacent to and coaxial with the cylinder block B and a plurality of motor ports 64 to communicate commonly with the motor cylinder holes 35 and the second valve holes 62 adjacent to and coaxial with the cylinder block B.

The first valve holes 61 have slidably inserted thereinto first distributing spool valves 65 and the second valve holes 62 have slidably inserted thereinto second distributing spool valves 66. Respectively through ball bearings 69 and 70, the first distributing spool valves 65 have their outer ends engaged with a first eccentric ring 67 encircling the first distributing spool valves 65 and the second distributing spool valves 66 have their outer ends engaged with a second eccentric ring 68 encircling the second distributing spool valves 66. Furthermore, the first distributing spool valves 65 have their ends linked with a first forced ring 71 coaxial with the first eccentric ring 67 and the second distributing spool valves 66 have their ends linked with a second forced ring 72 coaxial with the second eccentric ring 68.

The first eccentric ring 67 is provided integrally with the input cylinder shaft 25 and, as shown in FIG. 4, eccentrically positioned along the virtual trunnion axis line $O_1$ with a predetermined distance $\epsilon_1$ from the center of the cylinder block B. The second eccentric ring 68 is linked with the motor swashplate holder 38 and, as shown in FIG. 5 eccentrically positioned along the virtual trunnion axis line $O_2$ with a predetermined distance $\epsilon_2$ from the center of the cylinder block B.

The first distributing spool valves 65 operate as described hereinbelow. When a relative rotation is caused between the input cylinder shaft 25 and the pump cylinder 27 and, accordingly, the cylinder block B, each of the first distribution spool valves 65 is reciprocated by the first eccentric 67 in the first valve hole 61 between the radially inner position and outer position of the pump cylinder 27 with a stroke twice the eccentric distance $\epsilon_1$. As shown in FIG. 4, the first distributing spool valve 65 in a discharging range D of the hydraulic pump P shifts along the above-described inner position and communicates the pump port 63 corresponding thereto with the first ring-shaped oil passage 18 and shuts off the former from the second ring-shaped oil passage 19, in order to allow the pump plunger 29 in its discharging process to press out actuating oil from the pump cylinder hole 28 to the first ring-shaped oil passage 18. In a sucking range S of the hydraulic pump P, the first distributing spool valve 65 shifts along the above-described outer position and communicates with the second ring-shaped oil passage 19 and shuts off the former from the first ring-shaped oil passage 18, in order to allow the pump plunger 29 in its sucking process to suck actuating oil from the second ring-shaped oil passage 19 into the pump cylinder hole 28.

The second distributing spool valves 66 operate as described hereinbelow. When the motor cylinder 34 and, accordingly, the cylinder block B are rotated, each of the second distributing spool valves 66 is reciprocated by the second eccentric ring 68 in the second valve hole 62 between the radially inner position and outer position of the cylinder block B with a stroke twice the eccentric distance $\epsilon_2$. As shown in FIG. 5, the second distribution spool valve 66 in an expanding range Ex of the hydraulic motor M shifts along the above-described inner position and communicates the motor port 64 corresponding thereto with the first ring-shaped oil passage 18 and shuts off the motor port 64 and the second ring-shaped oil passage 19 from each other, in order to supply high-pressure actuating oil from the first ring-shaped oil passage to the motor cylinder hole 35 of the motor plunger in its expanding process. In a shrinking range Sh of the hydraulic motor M, the second distributing spool valve 66 shifts along the above-described outer position and communicates the motor port 64 corresponding thereto with the second ring-shaped oil passage 19 and shuts off the motor port 64 and the first ring-shaped oil passage 18 from each other, in order to discharge actuating oil from the motor cylinder hole 35 of the motor plunger 36 in its shrinking process to the second ring-shaped oil passage 19.

In this structure, the cylinder block B is rotated by a torque adding a reaction torque the pump cylinder 27 receives from the pump swashplate 30 through the pump plunger 29 in its discharging process to a reaction torque the motor cylinder 34 receives from the motor swashplate 37 through the motor plunger 36 in its expanding process and its rotational torque is transmitted from the forward and backward drive change-over mechanism 13 to the differential device $D_R$ through the output shaft 12.

A transmission ratio in this nonstep hydrostatic transmission is given as [1+(Capacity of Hydraulic Motor M)/(Capacity of Hydraulic Pump P)]. Accordingly, the transmission ratio can be varied from 1 to a level as required by changing the capacity of the hydraulic motor M from O to a larger value. As the capacity of the hydraulic motor M is determined by a stroke of the motor plunger 36, furthermore, the transmission ratio can be unintermittently controlled from 1 to a certain level by inclining the motor swashplate 37 from its upright position to a certain inclined position.

The second ring groove 57 of the valve cylinder 58 pressed into the center hole 51 of the cylinder block B forms a third ring-shaped oil passage 75 with the inner surface of the first center hole 51. The pump cylinder 27 has drilled therein between two of the first valve holes 61 adjacent to each other a communicating oil passage 76 communicating between the first ring-shaped oil passage 18 and the third ring-shaped oil passage 75. Thus, the third ring-shaped oil passage 75 is communicated with the first ring-shaped oil passage 18.

With the valve cylinder 58 pressed into the first center hole 51, the valve cylinder 58 is provided on one side of its radial direction with an oil supply passage 77 and on the other side of its radial direction with an oil supply passage 78 in a manner to have the two oil supply passages 77 and 78 mutually communicating therebetween. Namely, the cylinder block B is provided with communicating holes 79 and 80 drilled therein at their mutually corresponding positions clear of a plurality of the first and second distributing spool valves 65 and 66 and having their inner ends communicating with the oil supply passages 77 and 78 and their outer ends mutually communicating therebetween. The two communicating holes 79 and 80 are drilled in the cylinder block B in a manner to incline inwardly toward the inner side of the cylinder block B as they shift in the radially outward direction of the cylinder block B and the outer ends of the two communicating holes 79 and 80 are commonly opened on the outer circumference of the cylinder block B between the notched sections 59b of the third ring groove 59 adjacent to each other with their opened sections to be closed by the ring body 60 in a manner to keep them in their communicating position.

The oil supply passages 77 and 78 on the two sides of the valve cylinder 58 are mutually communicated therebetween through the communicating holes 79 and 80. In a manner to close the outer end of the oil supply passage 77, furthermore, the first center hole 51 has its outer end fitted with a throttle member 82 having a throttle nozzle 81. The fourth and fifth center holes 54 and 55 have inserted therein a cylindrical filter 83 with its inner end fitted in the fourth center hole 54 and its outer end fitted in the outer end of the fifth center hole 55 in a manner to form a ring-shaped oil passage 84 between the cylindrical filter 83 and the inner surface of the fifth center hole 55. Thus formed, the ring-shaped oil passage 84 is connected with the oil pump not shown through an oil passage 90 to conduct actuating oil supplied from the oil pump into the oil supply passages 77 and 78 through the cylindrical filter 83. Actuating oil leaking outside from the oil supply passage 77 through the throttle nozzle 81 is utilized as lubricant for interior sections and components of the nonstep hydrostatic transmission T.

Figure 7:
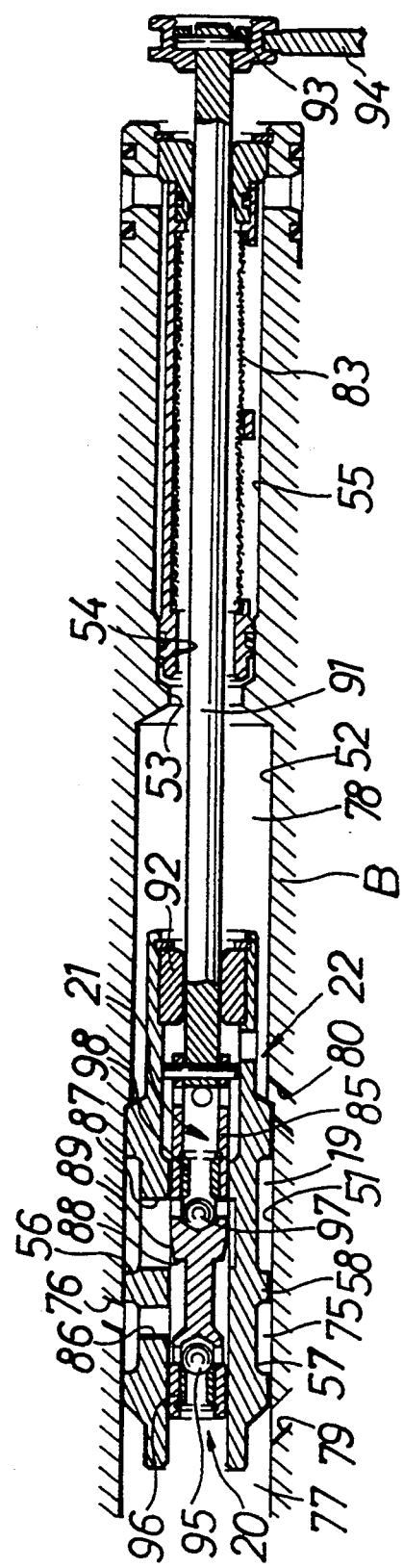
Figure 8:
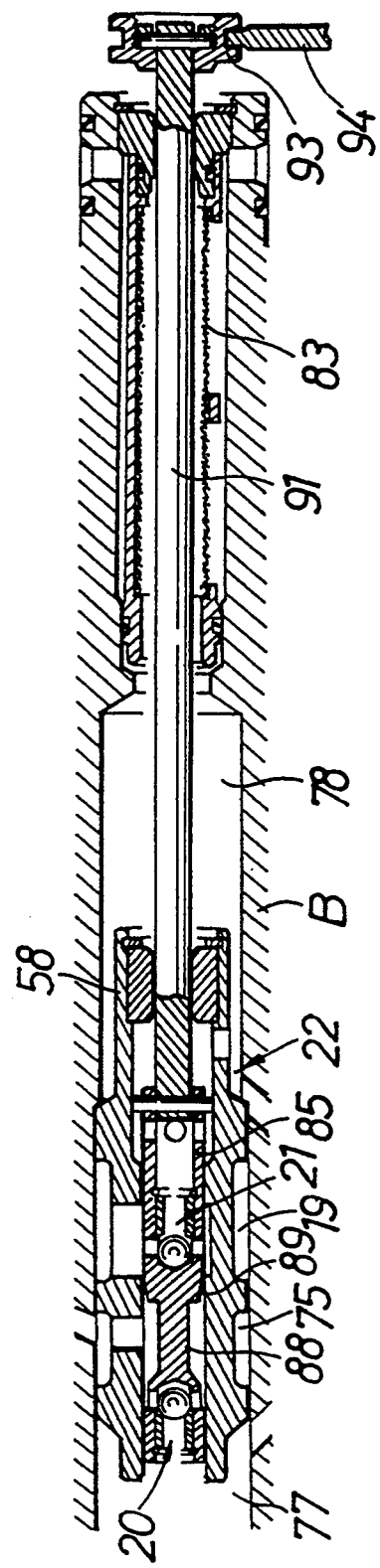
Figure 9:
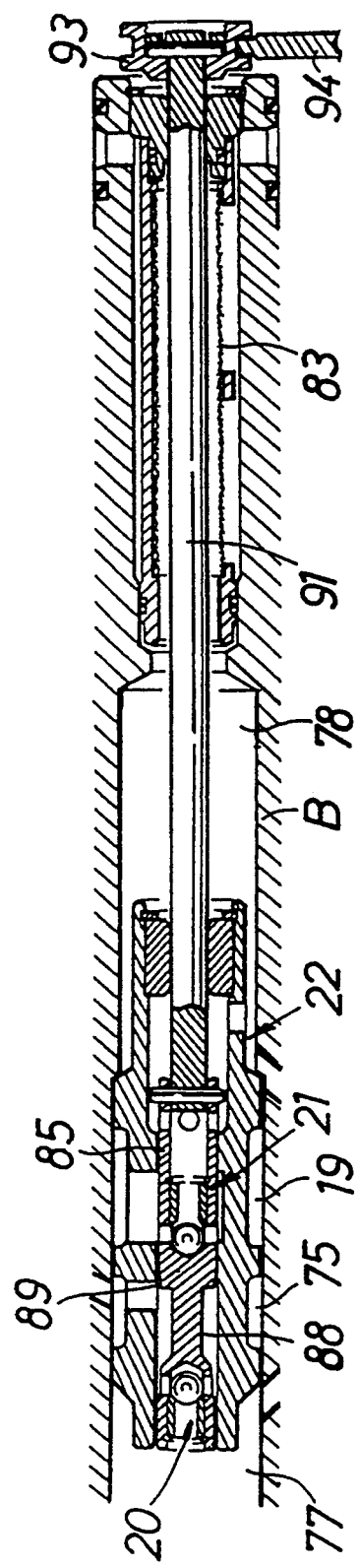

As shown in FIGS. 7, 8 and 9, the clutch valve 22 working between the third ring-shaped oil passage 75 and the second ring-shaped oil passage 19 communicating with the first ring-shaped oil passage 18 in response to clutch operations by the driver is constituted with a valve body 85 slidably fitted in the valve cylinder 58 and made switchable between a clutch-off position to communicate between the third and second ring-shaped oil passages 75 and 19 (as shown in FIG. 7) and a clutch-on position to shut off the third and second ring-shaped oil passages 75 and 19 from each other (as shown in FIG. 9) through a half-clutch position therebetween (as shown in FIG. 8).

The valve cylinder 58 has drilled therein a port 86 communicating with the third ring-shaped oil passage 75 and a port 87 communicating with the second ring-shaped oil passage 19. The valve body 85 is provided with a ring groove 88 permanently communicating with the port 86 and having a tapered section 89 along its edge on the side of the port 87. When the valve body 85 is in the clutch-off position as shown in FIG. 7, the ports 86 and 87, and accordingly, the third ring-shaped oil passage 75 and the second ring-shaped oil passage 19 are communicated therebetween through the ring groove 88. Shifted to the left side of FIG. 7 from the clutch-off position, the valve body 85 in the half-clutch opposition (as shown in FIG. 8) causes the flow of actuating oil between the ports 86 and 87 to be throttled through the tapered section 89. When the valve body 85 is shifted to the clutch-on position on the left side of FIG. 8 (as shown in FIG. 9), it causes the ports 86 and 87 to be shut off from each other.

The valve body 85 is linked with a shift rod 91 coaxially passing through the cylindrical filter 83 and has fixed thereto a bearing member 92 supporting slidably therethrough the shift rod 91. The shift rod 91 is projected outside the casing 17 with its outer end oil-tightly and slidably passing through the outer end of the cylindrical filter 83. The shift rod 91 has linked to its outer end a sleeve 93 which has engaged therewith a shift fork 94. As shown in FIG. 1, this shift fork 94 is linked to, for example, a hydraulic driving means 99 which, when operated, actuates the clutch valve 22.

The valve body 85 in the clutch valve 22 is provided with the first check valve 20 to allow the supply of actuating oil from the oil supply passage 77 to the third ring-shaped oil passage 75, in communication with the first ring-shaped oil passage 18 through communicating oil passage 76, and the second check valve 21 to allow the supply of actuating oil from the oil supply passage 78 to the second ring-shaped oil passage 19.

The first check valve 20 is provided in the middle of an oil flow passage provided in the valve body 85 between the oil supply passage 77 and the ring groove 88 and provided with a spherical valve body 95 and a cylindrical valve element 96 fixed to the valve body 85 to valve the spherical valve body 95. The second check valve 21 is provided in the middle of an oil flow passage provided in the valve body 85 between the oil supply passage 78 and the port 87 and provided with a spherical valve body 97 and a cylindrical valve element 98 fixed to the valve body 85 to valve the spherical valve body 97.

When the pressure of the second ring-shaped oil passage 19 on the low-pressure side drops below the pressure of the oil supply passage 78 due to oil leakage from the closed hydraulic circuit between the hydraulic pump P and the hydraulic motor M under normal operational load, the second check valve 21 is caused to open and allow actuating oil to be supplied form the oil supply passage 78 to the second ring-shaped oil passage 19. Actuating oil in the first and third ring-shaped oil passages 18 and 78 on the high-pressure side is prevented from flowing to the oil supply passage 77 by the first check valve 20.

Under reversed load, namely with engine brake effected, the hydraulic motor M is actuated to perform its pumping operation and the hydraulic pump P to perform its motoring operation. With the first ring-shaped oil passage 18 shifted to have a low pressure and the second ring-shaped oil passage 19 a high pressure accordingly, a flow of actuating oil from the second ring-shaped oil passage 19 to the oil supply passage 78, when the pressure of the first ring-shaped passage 18 and the third ring-shaped oil passage 75 is caused to drop below the pressure of the oil supply passage 77 due to oil leakage, is stopped by the second check valve 21.

Figure 10:
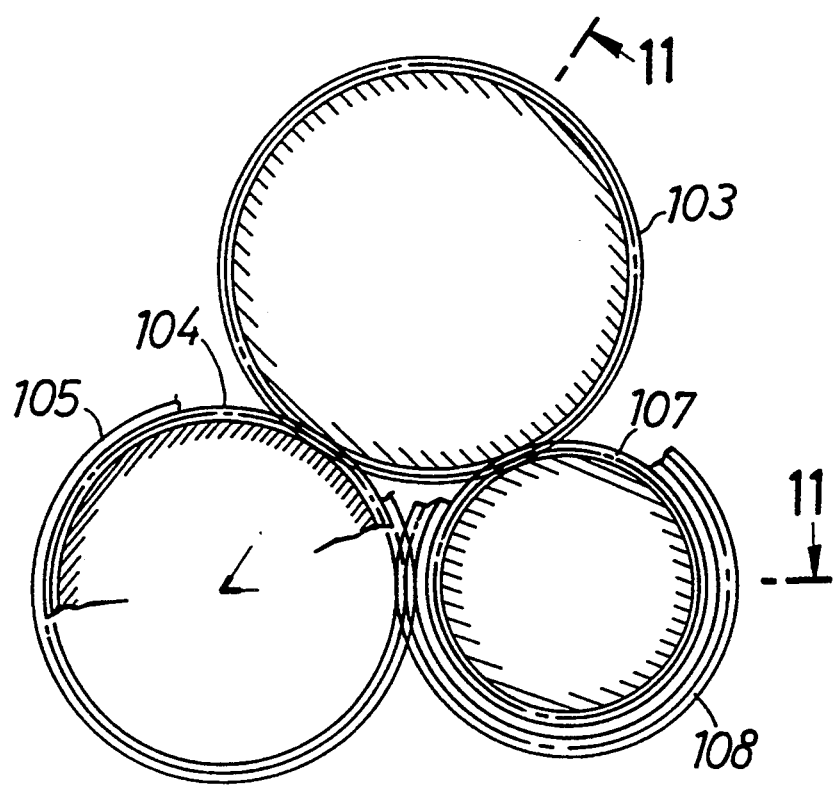
Figure 11:
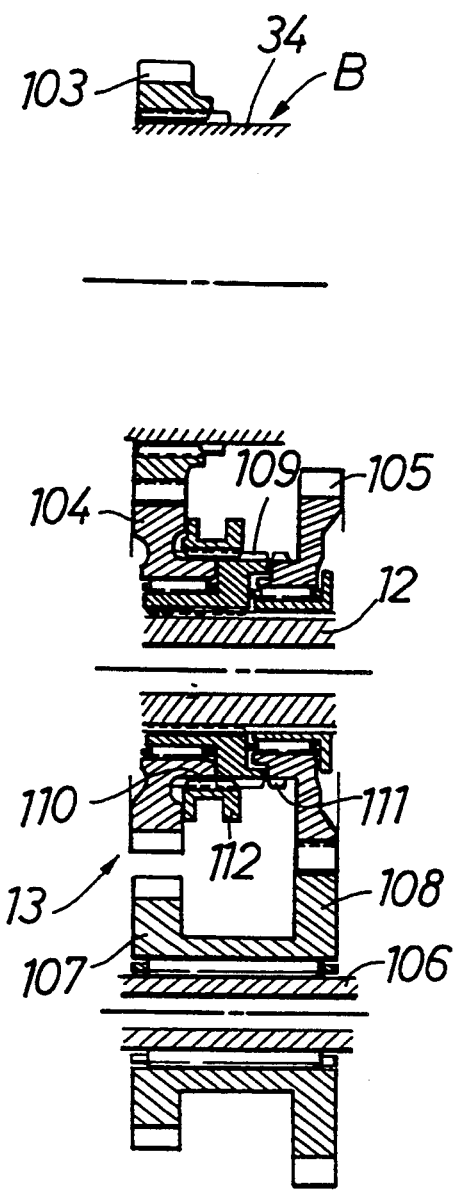

Referring to FIGS. 10 and 11, the output shaft 12 parallel with the nonstep hydrostatic transmission T is supported to the casing 17 through a roller bearing 101 and a ball bearing 102. The forward and backward drive change-over mechanism 13 interposed between this output shaft 12 and the nonstep hydrostatic transmission T has a driving gear 103 fixed to the outer circumference of the motor cylinder 34 in the cylinder block B, a forward driving follower gear 104 rotatably supported to the output shaft 12 in permanent engagement with the driving gear 103, a backward driving follower gear 105 rotatably supported to the output shaft 12, a first idle gear 107 rotatably supported by a support shaft 106 fixed to the casing 17 to engage with the driving gear 103, a second idle gear 108 formed integrally with the first idle gear 107 to engage with the backward driving follower gear 105, a toothed clutch ring 109 spline-connected to the output shaft 12 between the forward driving follower gear 104 and the backward driving follower gear 105, a clutch element 112 permanently engaged with the toothed clutch ring 109 to be selectively linked to the toothed rings 110 and 111 respectively formed integrally with the forward driving follower gear 104 and the backward driving follower gear 105 and a shift fork 113 to operate the clutch element 112.

The use of the forward and backward drive change-over mechanism 13 as explained in the above, when the clutch element 112 and the toothed clutch ring 109 are communicated therebetween, causes the driving force of the nonstep hydrostatic transmission T to be transmitted to the output shaft 12 through the driving gear 103, the forward driving follower gear 104, the toothed ring 110 and the toothed clutch ring 109. When the toothed clutch ring 109 and the toothed ring 111 are communicated therebetween by the clutch member 112, the driving force of the nonstep hydrostatic transmission T is transmitted to the output shaft 12 through the driving gear 103, the first and second idle gears 107 and 108, the backward driving follower gear 105, the toothed ring 111 and the clutch element 112.

The output shaft 12 has a parking gear 114 fixed adjacent to the output gear 14 with which a locking claw (not shown) supported to the casing 17 can be engaged.

As for the operations of this embodiment, the clutch valve 22 is constituted with the valve body 85 fitted in the valve cylinder 58 fitted in and connected to the center of the cylinder block B in a switchable manner to communicate between or shut off from each other the second and third ring-shaped oil passages 19 and 75 formed between the valve cylinder 58 and the cylinder block B. Accordingly, the radial center of the cylinder block B located radially inward of the inner extent of a plurality of the first and second distributing spool valves 65 and 66 which are radially arranged in the cylinder block B can be utilized to arrange the clutch valve 22 therein, making it possible to prevent the cylinder block B from becoming large in size and heavy in weight. Since the clutch valve 22 is made with a single piece, its processing requires less steps. With the valve cylinder 58 made separately from the cylinder block, furthermore, the processing and assembling of the clutch valve 22 can be improved. By making a distance between the first ring-shaped oil passage 18 and the second ring-shaped oil passage 19 and the clutch valve relatively short, it also becomes possible to keep an oil flow resistance relatively low and ensure improved response even when a flow of actuating oil is relatively large.

An operative system of the clutch valve 22, namely, a combination of the sleeve 93 linked with the shift rod 91 and the shift fork 94 engaged with the sleeve 93, can be provided to the axial end of the shaft 45 and, therefore, can be made simple and compact.

By fitting the valve body 85 constituting the clutch valve 22 with the first check valve 20 to allow the supply of actuating oil from the oil supply passage 77 to the third ring-shaped oil passage 75 and the second check valve 21 to allow the supply of actuating oil from the oil supply passage 78 to the second ring-shaped oil passage 19, the clutch valve 22 and the two check valves 20 and 21 can be modularized and simplified in structure.

As the oil supply passages 77 and 78 on the two sides of the valve cylinder 58 are communicated therebetween through the communicating holes 79 and 80 drilled in the cylinder block B, the valve cylinder 58 requires no eccentric passage to be provided to communicate between the two oil supply passages 77 and 78. This makes it possible to keep the thickness of the valve cylinder 58, namely its diameter, relatively small and, accordingly, the cylinder block B needs not to be made large in size. Filtered through the cylindrical filter 83 and discharged through the throttle nozzle 81 after flowing inside the cylinder block B in its axial direction, actuating oil constitutes a permanent flow inside the cylinder block B and contributes to cool the cylinder block B.

The driving force from the nonstep hydrostatic transmission T is transmitted form the motor cylinder 34 to the intermediate section of the output shaft 12 through the forward and backward drive switch-over mechanism 13 without causing any great degree of twisting force to the shafts 44 and 45 of the cylinder block B. Therefore, it is not necessary to increase the thickness of the shafts 44 and 45 to give them increased strength. Since the shafts 44 and 45 can be made relatively short in length, furthermore, the cylinder B can be made compact in size.

While there has been described a preferred embodiment of the present invention, obviously modifications and variations are possible without departing from the scope of claims for the present invention. Therefore, it is to be understood that the concrete structures and shapes incorporated into the foregoing embodiment specifically described herein are, illustrative and not restrictive.

What is claimed is:

1. A nonstep hydrostatic transmission comprising
   a cylinder block including a pump cylinder having circularly arranged therein a plurality of pump cylinder holes and a motor cylinder arranged coaxially with said pump cylinder and having circularly arranged therein a plurality of motor cylinder holes; and
   a casing rotatably supporting said cylinder block;
   characterized in further comprising a clutch valve including a bore in said cylinder block and a valve cylinder in said bore, said cylinder block further including a first ring-shaped oil passage extending circumferentially about said cylinder block, a second ring-shaped oil passage coaxial with said first ring-shaped oil passage between said valve cylinder and said cylinder block, said cylinder block further including a plurality of radially arranged first distributing valves between said plurality of pump cylinder holes and said plurality of motor cylinder holes to communicate said pump cylinder holes alternately with said first and second, ring-shaped oil passages and a plurality of radially arranged second distributing valves between said plurality of pump cylinder holes and said plurality of motor cylinder holes to communicate said motor cylinder holes alternately with said first and second ring-shaped oil passages, a third ring-shaped oil passage between said valve cylinder and said cylinder block, a valve body slidably fitted into the valve cylinder to allow selective communication between said second and third oil passages, said valve body including a first check valve permitting flow from one end of said valve body to said third ring-shaped oil passage and a second check valve permitting flow from the other end of said valve body to said second ring-shaped oil passage.

2. The nonstep hydrostatic transmission of claim 1, said valve cylinder being fixed in said bore.

3. A nonstop hydrostatic transmission comprising
a cylinder block including a pump cylinder having circularly arranged therein a plurality of pump cylinder holes and a motor cylinder arranged coaxially with said pump cylinder and having circularly arranged therein a plurality of motor cylinder holes; and
a casing rotatably supporting said cylinder block;
characterized in further comprising a clutch valve including a bore in said cylinder block and a valve cylinder in said bore, said cylinder block further including a first ring-shaped oil passage extending circumferentially about said cylinder block, a second ring-shaped oil passage coaxial with said first ring-shaped oil passage between said valve cylinder and said cylinder block, said cylinder block further including a plurality of radially arranged first distributing valves between said plurality of pump cylinder holes and said plurality of motor cylinder holes to communicate said pump cylinder holes alternately with said first and second ring-shaped oil passages and a plurality of radially arranged second distributing valves between said plurality of pump cylinder holes and said plurality of motor cylinder holes to communicate said motor cylinder holes alternately with said first and second ring-shaped oil passages, a third ring-shaped oil passage between said valve cylinder and said cylinder block, a valve body in said valve cylinder, a first check valve in said valve cylinder permitting flow from one end of said valve body to said third ring-shaped oil passage and a second check valve in said valve cylinder permitting flow from the other end of said valve body to said second ring-shaped oil passage, said cylinder block further including a first passage in communication with said one end of said valve body and a second passage in communication with said other end of said valve body and with said first passage at the circumference of said cylinder block.

4. The nonstep hydrostatic transmission of claim 3 wherein said third ring-shaped passage communicates with said first ring-shaped passage.

5. The nonstep hydrostatic transmission of claim 3, said valve cylinder being fixed in said bore.

* * * * *